May 25, 1937.  E. E. HEWITT  2,081,452
FLUID PRESSURE BRAKE
Filed June 13, 1935
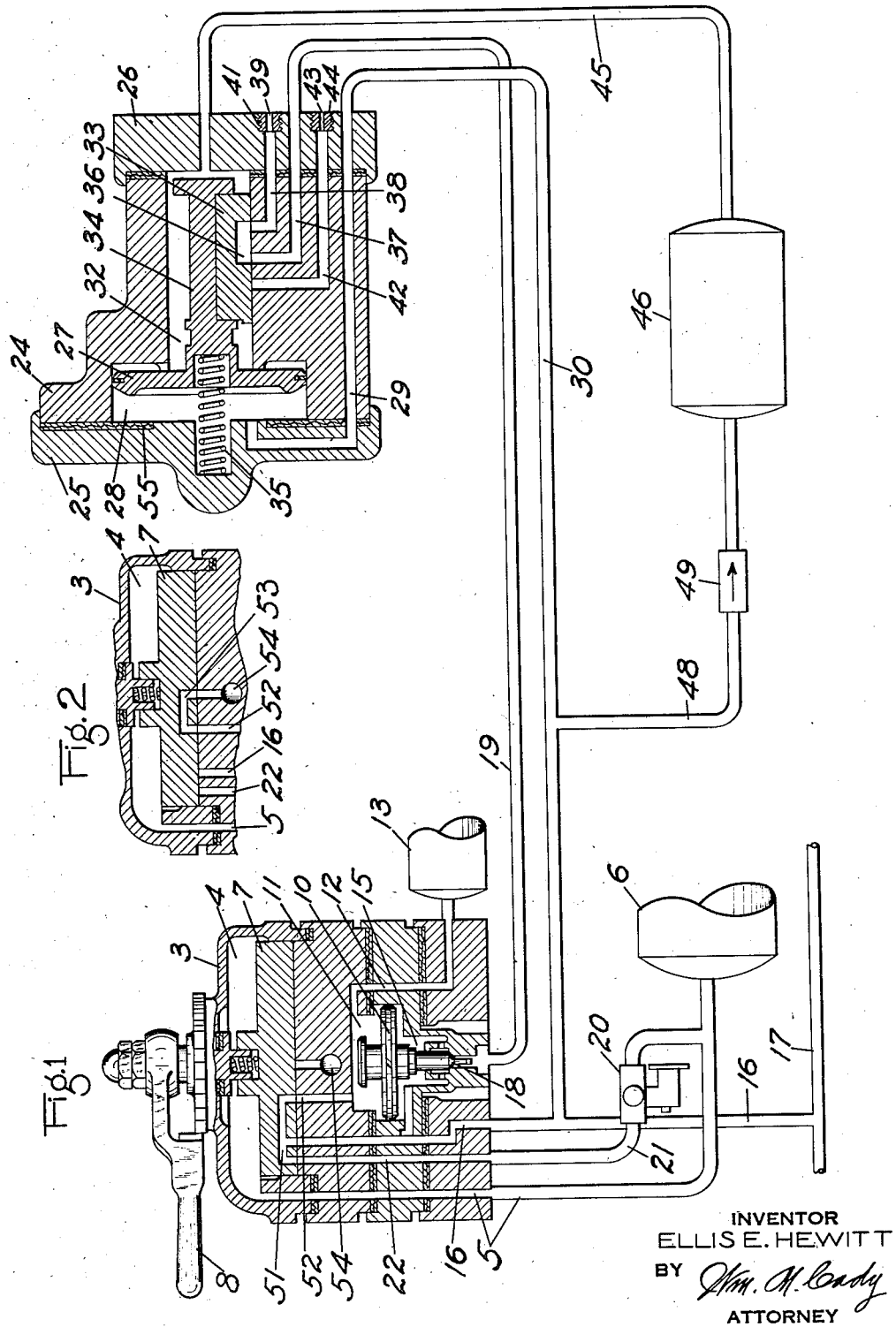
INVENTOR
ELLIS E. HEWITT
BY Wm. M. Cady
ATTORNEY Patented May 25, 1937

2,081,452

UNITED STATES PATENT OFFICE 2,081,452

FLUID PRESSURE BRAKE

Ellis E. Hewitt, Edgewood, Pa., assignor to The Westinghouse Air Brake Company, Wilmerding, Pa., a corporation of Pennsylvania Application June 13, 1935, Serial No. 26,393

16 Claims. (Cl. 303—55)

This invention relates to fluid pressure brakes, and more particularly to a fluid pressure brake system in which the brakes are controlled by varying the brake pipe pressure.

In effecting a service application of the brakes on a long train, because of the well known fact that a reduction in brake pipe pressure is operative on the brakes serially from the head end of the train toward the rear end, it is desirable that the reduction in brake pipe pressure initiated by operation of the engineer's brake valve be controlled or limited to a light rate, in order to minimize the tendency of the brakes on the forward cars of the train to apply in advance of the action of the brakes on rearward cars with such force as to permit the slack, which is considerable on most long trains, to run in harshly and cause damaging shocks.

The principal object of my invention is to provide means automatically operative, upon operation of the brake valve to effect a service application of the brakes, to limit the rate of reduction in brake pipe pressure so as to avoid causing the brakes on the cars at the head end of the train to be applied with such force in advance of the application of the brakes at the rear end as to permit the slack to gather with sufficient violence to produce excessive shocks.

In the accompanying drawing; Fig. 1 is a diagrammatic view, partly in section, of a portion of a locomotive brake equipment embodying my invention; and Fig. 2 is a section of the brake valve device, showing the rotary valve in service application position.

The brake valve device shown in Fig. 1 may be of the conventional type comprising a casing 3, having a valve chamber 4 connected through a passage and pipe 5 to the usual main reservoir 6, and containing a rotary valve 7, adapted to be operated by a handle 8.

Mounted in the casing 3 is the usual equalizing discharge valve mechanism, comprising a piston 10 having on one side a chamber 11 connected through a passage 12 to the usual equalizing reservoir 13, and having a valve chamber 15 on the opposite side connected through a passage and pipe 16 with the usual brake pipe 17. Contained in valve chamber 15 is a discharge valve 18, adapted to be operated by the piston 10 for controlling the venting of fluid under pressure from said chamber, and thereby from the brake pipe 17, to an exhaust pipe 19 connected to the discharge outlet of said valve.

The usual feed valve device 20 supplies fluid at a reduced pressure from the main reservoir 6 through a pipe 21 to a passage 22 leading to the seat of rotary valve 7.

According to my invention there is provided a valve device for controlling the discharge outlet of the discharge valve 18 comprising a casing 24 closed at one end by a cap plate 25 and at the opposite end by a pipe bracket 26, and containing a piston 27 slidably mounted in a bore in said casing. The piston 27 has at one side a chamber 28, connected through a passage 29, a pipe 30, and the pipe 16 to the brake pipe 17, and has at the opposite side a valve chamber 32, which contains a slide valve 33, adapted to be operated by said piston through the medium of a stem 34. A spring 35 is disposed between the cap plate 25 and piston 27, and acts on said piston for urging it to the position shown.

The slide valve has a cavity 36, which, in the position of the valve as shown in Fig. 1, establishes communication from a passage 37, connected to the exhaust pipe 19, to the atmosphere by way of a passage 38 and a restricted port 39 in a choke plug 41. The cavity 36 is also adapted to register with a passage 42, in another position of the device, for connecting the pipe 19 to the atmosphere by way of said passage and a restricted port 43 in a choke plug 44.

The valve chamber 32 is connected through a pipe 45 to a volume reservoir 46, to which is connected a pipe 48, leading from the pipe 30, past a non-return check valve 49.

In operation, the main reservoir 6 being charged with fluid under pressure in the usual manner, fluid under pressure flows from the main reservoir through pipe and passage 5 to valve chamber 4 in the brake valve device. In the running position of the brake valve device, as shown in Fig. 1, a cavity 51 in the rotary valve 7 registers with feed valve passage 22 and with a passage 52 open to the chamber 11, so that fluid under pressure is supplied by the feed valve device 20, at the pressure normally maintained in the system, to pipe 21 and thence through passage 22, cavity 51, and passage 52 to chamber 11, and from chamber 11 to the equalizing reservoir 13 by way of passage 12.

The feed valve passage 22 is also connected through cavity 51 with passage and pipe 16, leading to brake pipe 17, so that the brake pipe is maintained charged with fluid at feed valve pressure. From pipe 16, fluid under pressure flows through pipe 30 to the passage 29 in the vent control valve device, and thence to chamber 28. Fluid under pressure from pipe 30 also flows through pipe 48 and past the check valve 49 to the volume reservoir 46, charging said reservoir, and thence flows through pipe 45 to valve chamber 32 of the vent control valve device.

When it is desired to effect a service application of the brakes, the brake valve device is turned to service application position, in which the rotary valve 7 assumes the position shown in Fig. 2. In this position, the passages 16 and 22 are lapped and the passage 52 is connected through a cavity 53 in the rotary valve with an atmospheric exhaust port 54.

Fluid under pressure is then vented from chamber 11 and the connected equalizing reservoir 13, according to the length of time the rotary valve 7 is held in service position. The reduction in pressure in chamber 11 and equalizing reservoir 13 permits the brake pipe pressure in chamber 15 to move piston 10 upwardly, thereby lifting discharge valve 18 from its seat and permitting fluid under pressure to flow from the brake pipe 17 by way of pipe and passage 16, chamber 15, and past the unseated discharge valve to pipe 19.

Fluid under pressure thus initially vented to the pipe 19 flows through passage 37 in the vent control valve device and thence to atmosphere by way of slide valve cavity 36, the connected passage 38, and a choke port 39. This choke port is of such size as will permit a substantially normal rate of venting of fluid under pressure from the brake pipe, so that the reduction in brake pipe pressure initiated is sufficient to cause the triple valve device on the first car of the train to move to service application position, thereby causing the usual quick service means to effect a local reduction in brake pipe pressure, which is propagated serially throughout the train in a well known manner.

The brake pipe pressure is thus reduced by the operation of the discharge valve 18, and chamber 28 being connected to the brake pipe by way of passage 29 and pipe 30, the pressure in chamber 28 reduces with the brake pipe pressure. The reduction in fluid pressure in chamber 28 permits the pressure of fluid in chamber 32 and the connected volume reservoir 46 to act against piston 27, overcoming the opposing pressure of spring 35 and moving said piston, the stem 34 and slide valve 33 toward the left hand, until the piston engages a gasket 55, which is disposed on the inner face of cap plate 25 and between said plate and the casing 24. With the slide valve 33 in this position, passage 38 is blanked and cavity 36 connects pasage 37 with passage 42. The rate at which fluid is vented from the brake pipe is now determined by the restricted port 43, which port is of such flow area as to provide the desired slow rate of reduction in brake pipe pressure.

Upon reduction of the pressure in the equalizing reservoir 13 to the desired degree, the brake valve device is moved from service application to lap position, so that when the brake pipe pressure is reduced to a degree slightly less than the reduced equalizing reservoir pressure, the piston 10 operates to seat the discharge valve 18.

The initial reduction in brake pipe pressure at a substantially normal rate, as effected by venting the brake pipe by way of the port 39 of the vent control valve device, is sufficient to cause a light brake application throughout the train, thus ensuring a gentle gathering of the slack, while the further reduction of brake pipe pressure at a limited rate by the venting of fluid from said brake pipe through the restricted port 43 permits the brakes to be applied with gradually increasing force, but not at such a rate as will result in shocks.

It will be evident from the foregoing description that upon movement of the brake valve to effect a service application of the brakes, the vent control valve device permits an initial reduction of brake pipe pressure at a rate sufficient to cause a light application of the brakes and the propagation of quick service, and then operates to permit brake pipe pressure to reduce further at a restricted rate, so as to avoid violent slack action.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake system for a train, the combination with a brake pipe, quick service brake apparatus on the cars of the train, and a brake valve device having an equalizing discharge valve mechanism for venting fluid under pressure from the brake pipe, of a volume reservoir normally charged with fluid under pressure from the brake pipe, a check valve for preventing backflow of fluid from said reservoir to said brake pipe, and a vent control device comprising a movable abutment subject to the opposing pressures of the brake pipe and the volume reservoir, and valve means operated by said abutment and adapted initially to vent fluid under pressure released from the brake pipe by the equalizing discharge valve at such a rate as will propagate quick service operation of the brake apparatus on the cars of the train, and then to vent fluid under pressure flowing from said brake pipe at a slower rate.

2. In a fluid pressure brake, in combination, a brake pipe, an equalizing reservoir, valve means operative on a reduction in the pressure of the fluid in the equalizing reservoir to vent fluid from the brake pipe, and means subject to and operated on a reduction in the pressure of the fluid in the brake pipe to thereafter continuously restrict the rate at which fluid is vented from the brake pipe by said valve means so long as the brake pipe pressure remains reduced.

3. In a fluid pressure brake, in combination, a brake pipe, an equalizing reservoir, valve means subject to the opposing pressures of the fluid in the brake pipe and in the equalizing reservoir and operative on a reduction in the pressure of the fluid in the equalizing reservoir to vent fluid from the brake pipe, and means subject to and operated on a reduction in the pressure of the fluid in the brake pipe to continuously restrict the rate at which fluid is vented from the brake pipe by said valve means during the period the brake pipe pressure remains reduced.

4. In a fluid pressure brake, in combination, a brake pipe, an equalizing reservoir, valve means subject to the opposing pressures of the fluid in the brake pipe and in the equalizing reservoir and controlling the venting of fluid from the brake pipe, a valve device subject to the opposing pressures of the fluid in the brake pipe and of the fluid in a chamber and controlling the rate at which fluid is vented from the brake pipe by the said valve means, and means for supplying fluid to said chamber at the pressure of the fluid carried in the brake pipe.

5. In a fluid pressure brake, in combination, a brake pipe, an equalizing reservoir, valve means operative upon a reduction in the pressure of the fluid in the equalizing reservoir to vent fluid from the brake pipe, a valve device subject to the opposing pressures of the fluid in the brake pipe and of the fluid in a chamber and controlling the rate at which fluid is vented from the brake pipe by the said valve means, and means to supply fluid under pressure to said chamber at the pressure carried in the brake pipe.

6. In a fluid pressure brake, in combination, a brake pipe, an equalizing reservoir, valve means operative upon a reduction in the pressure of the fluid in the equalizing reservoir to vent fluid from the brake pipe, a valve device subject to the opposing pressures of the fluid in the brake pipe and of the fluid in a chamber and controlling the rate at which fluid is vented from the brake pipe by the said valve means, means to supply fluid under pressure to said chamber at the pressure carried in the brake pipe, and means to prevent the release of fluid from said chamber on a reduction in the pressure in the brake pipe.

7. In a fluid pressure brake, in combination, a brake pipe, an equalizing reservoir, valve means subject to the opposing pressures of the fluid in the brake pipe and in the equalizing reservoir and controlling the venting of fluid from the brake pipe, a valve device subject to the opposing pressures of the fluid in the brake pipe and of the fluid in a chamber and controlling the rate at which fluid is vented from the brake pipe by the said valve means, means for supplying fluid under pressure from the brake pipe to said chamber, and means to prevent the flow of fluid from said chamber to the brake pipe.

8. In a fluid pressure brake, in combination, a brake pipe, an equalizing reservoir, valve means operative upon a reduction in the pressure of the fluid in the equalizing reservoir to vent fluid from the brake pipe, a valve device subject to the opposing pressures of the fluid in the brake pipe and of the fluid in a chamber and controlling the rate at which fluid is vented from the brake pipe by the said valve means, means for supplying fluid under pressure from the brake pipe to said chamber, and means to prevent the flow of fluid from said chamber to the brake pipe.

9. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe at a different rate, biasing means associated with said device and yieldingly urging said device to the position to permit the valve means to vent fluid from the brake pipe at the said one rate, said device being subject to and operated on a reduction in the pressure of the fluid in the brake pipe to move to the position to permit said valve means to vent fluid from the brake pipe at said different rate.

10. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe only at a slower rate, biasing means associated with said device and yieldingly urging said device to the position to permit the valve means to vent fluid from the brake pipe at the said one rate, said device being subject to and operated on a reduction in the pressure of the fluid in the brake pipe to move to the position to permit said valve means to vent fluid from the brake pipe only at said slower rate.

11. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe at a different rate, biasing means associated with said device and yieldingly urging said device to the position to permit the valve means to vent fluid from the brake pipe at the said one rate, said device being subject to and operated on a predetermined reduction in the pressure of the fluid in the brake pipe to move to the position to permit said valve means to vent fluid from the brake pipe at said different rate.

12. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe at a different rate, biasing means associated with said device and yieldingly urging said device to the position to permit the valve means to vent fluid from the brake pipe at the said one rate, said device being subject to the opposing pressures of the fluid in the brake pipe and in a chamber and being operated on a reduction in the pressure of the fluid in the brake pipe to move to the position to permit said valve means to vent fluid from the brake pipe at said different rate, and means to supply fluid under pressure to said chamber at the pressure carried in the brake pipe.

13. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe at a different rate, biasing means associated with said device and yieldingly urging said device to the position to permit the valve means to vent fluid from the brake pipe at the said one rate, said device being subject to the opposing pressures of the fluid in the brake pipe and in a chamber and being operated on a reduction in the pressure of the fluid in the brake pipe to move to the position to permit said valve means to vent fluid from the brake pipe at said different rate, and means to supply fluid under pressure to said chamber from the brake pipe.

14. In a fluid pressure brake, in combination, a brake pipe, an equalizing reservoir, valve means operative on a reduction in the pressure of the fluid in the equalizing reservoir to vent fluid from the brake pipe, and a device for controlling the rate at which fluid is vented from the brake pipe by said valve means, said device having one position in which it permits said valve means to vent fluid from the brake pipe at one rate and having another position in which it permits the valve means to vent fluid from the brake pipe at a different rate, biasing means associated with said device and yieldingly urging said device to the position to permit the valve means to vent fluid from the brake pipe at the said one rate, said device being subject to the opposing pressures of the fluid in the brake pipe and in a chamber and being operated on a reduction in the pressure of the fluid in the brake pipe to move to the position to permit said valve means to vent fluid from the brake pipe at said different rate, means to supply fluid under pressure to said chamber from the brake pipe, and means to prevent the flow of fluid from said chamber to the brake pipe.

15. In a fluid pressure brake, in combination, a brake pipe, a brake valve device operative to vent fluid under pressure from the brake pipe, a movable abutment subject to the pressure of fluid in the brake pipe and to a substantially constant opposing pressure, and valve means operable by said abutment to control the rate at which fluid under pressure is vented from the brake pipe by said brake valve device.

16. In a fluid pressure brake, in combination, a brake pipe, a brake valve device operative to vent fluid under pressure from the brake pipe, and means for controlling communication through which fluid is vented from the brake pipe by said brake valve device, said means comprising a valve having one position in which the venting of fluid from the brake pipe by said brake valve device is at one rate and having another position in which the venting of fluid from the brake pipe by said brake valve device is at another rate, and a movable abutment subject to the pressure of fluid in the brake pipe and to a substantially constant opposing pressure for operating said valve.

ELLIS E. HEWITT.